US012763393B2

(12) United States Patent
Kogami et al.

(10) Patent No.: US 12,763,393 B2
(45) Date of Patent: Oct. 13, 2026

(54) POWER SUPPLY DEVICE AND ELECTRIC VEHICLE

(71) Applicant: SANYO Electric Co., Ltd., Osaka (JP)

(72) Inventors: Nao Kogami, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 991 days.

(21) Appl. No.: 17/441,239

(22) PCT Filed: Dec. 20, 2019

(86) PCT No.: PCT/JP2019/050066
§ 371 (c)(1),
(2) Date: Sep. 20, 2021

(87) PCT Pub. No.: WO2020/194939
PCT Pub. Date: Oct. 1, 2020

(65) Prior Publication Data

US 2022/0173454 A1 Jun. 2, 2022

(30) Foreign Application Priority Data

Mar. 27, 2019 (JP) ................................ 2019-060106

(51) Int. Cl.
*H01M 10/625* (2014.01)
*H01M 10/658* (2014.01)
*H01M 50/209* (2021.01)
*H01M 50/264* (2021.01)
(Continued)

(52) U.S. Cl.
CPC ....... *H01M 10/625* (2015.04); *H01M 10/658* (2015.04); *H01M 50/209* (2021.01); *H01M 50/264* (2021.01); *H01M 50/291* (2021.01); *H01M 50/293* (2021.01); *H01M 2220/20* (2013.01)

(58) Field of Classification Search
CPC ............ H01M 10/625; H01M 10/658; H01M 50/209; H01M 2220/20
See application file for complete search history.

(56) References Cited

U.S. PATENT DOCUMENTS

2014/0335398 A1 11/2014 Partin et al.
2019/0006642 A1 1/2019 Sakaguchi et al.
2020/0058912 A1 2/2020 Kuramitsu et al.

FOREIGN PATENT DOCUMENTS

CN 106025434 A 10/2016
CN 205657108 U 10/2016
JP 2018-204708 12/2018
(Continued)

OTHER PUBLICATIONS

International Search Report of PCT application No. PCT/JP2019/050066 dated Mar. 24, 2020.
(Continued)

*Primary Examiner* — Adam A Arciero
(74) *Attorney, Agent, or Firm* — WHDA, LLP

(57) ABSTRACT

A power supply device includes a battery block in which a plurality of battery cells are stacked in a thickness with separator interposed therebetween, a pair of end plates disposed on both end surfaces of the battery block, and a binding bar coupled to the pair of end plates and fixing a battery block in a pressurized state via the end plates. Separator includes heat insulating sheet in which a gap of a fiber sheet is filled with silica aerogel, and rubbery elastic sheet stacked on a surface of heat insulating sheet.

13 Claims, 7 Drawing Sheets

(51) Int. Cl.
*H01M 50/291* (2021.01)
*H01M 50/293* (2021.01)

(56) References Cited

FOREIGN PATENT DOCUMENTS

| | | | |
|---|---|---|---|
| WO | 2017/159527 | | 9/2017 |
| WO | 2018/061894 | | 4/2018 |
| WO | 2018/207607 | A1 | 11/2018 |

OTHER PUBLICATIONS

English Translation of Chinese Search Report dated Sep. 13, 2023 for the related Chinese Patent Application No. 201980093856.9.
English Translation of Chinese Search Report dated Dec. 8, 2022 for the related Chinese Patent Application No. 201980093856.9. (2 pages).

POWER SUPPLY DEVICE AND ELECTRIC VEHICLE

CROSS-REFERENCE TO RELATED APPLICATIONS

This application is a U.S. national stage application of the PCT International Application No. PCT/JP2019/050066 filed on Dec. 20, 2019, which claims the benefit of foreign priority of Japanese patent application No. 2019-060106 filed on Mar. 27, 2019, the contents all of which are incorporated herein by reference.

TECHNICAL FIELD

The present invention relates to a power supply device in which a large number of battery cells are stacked, and an electric vehicle on which the power supply device is mounted.

BACKGROUND ART

A power supply device in which a large number of battery cells are stacked is suitable as a power supply that is mounted on an electric vehicle and supplies electric power to a motor that drives the vehicle, a power supply that is charged with natural energy such as a solar cell or midnight power, and a backup power supply for power failure. In the power supply device having this structure, the separator is sandwiched between the stacked battery cells. The separator insulates heat conduction between the battery cells and suppresses induction of thermal runaway of the battery cells. The thermal runaway of the battery cell occurs due to an internal short circuit caused by a short circuit between the positive electrode and the negative electrode inside, erroneous handling, or the like. Since a large amount of heat is generated when thermal runaway of the battery cell occurs, thermal runaway is induced in the adjacent battery cell when the heat insulating property of the separator is not sufficient. When the thermal runaway of the battery cell is induced, the entire power supply device emits extremely large thermal energy to impair safety as a device. In order to prevent this adverse effect, a separator having a thermal insulating property using silica aerogel has been developed. This separator is obtained by filling a gap of a fiber sheet with silica aerogel having an extremely low thermal conductivity of 0.02 W/m·K, and achieves excellent thermal insulating properties. However this separator has a disadvantage in which the thermal insulating properties are deteriorated when silica aerogel is broken by external pressure.

In the power supply device in which the battery cells are stacked, the battery cells expand in a charged/discharged state, and the separator is pressed with a strong pressure, but this state causes destruction of the silica aerogel and deterioration of the thermal insulation characteristics. In a power supply device in which a large number of battery cells are stacked with a separator interposed therebetween, the stacked battery cells are fixed in a pressurized state in order to prevent positional displacement due to expansion of the battery cells. In order to achieve this, in the power supply device, a pair of end plates is disposed on both end surfaces of a battery block in which a large number of battery cells are stacked, and the pair of end plates is connected by bind bars. The binding bar and the end plate hold the battery cell in a pressurized state with considerably strong pressure to prevent malfunction due to relative movement and vibration of the battery cell. For this reason, for example, in a power supply device in which battery cells having a stacking surface area of about 100 square centimeters are stacked, the end plate is pressed with a strong force of several tons and fixed with a binding bar. A separator having a structure in which the separator is sandwiched between battery cells in a pressurized state to suppress deterioration of heat insulating properties has been developed. (See PTL 1)

CITATION LIST

Patent Literature

PTL 1: Unexamined Japanese Patent Publication No. 2018-204708

SUMMARY OF THE INVENTIO

The separator of PTL 1 has a composite layer containing a fiber sheet and a silica aerogel, and the fiber sheet is folded back and laminated to form a multilayer structure, which is pressurized to prevent destruction of the silica aerogel. Since the separator having this structure is folded and laminated, there is a disadvantage that the entire separator becomes thick, and further, there is a disadvantage that the internal structure becomes uneven between the folded portion and the laminated portion of the fibrous sheet, and it is difficult to equalize the pressure difference at the pressing surface with the battery cell. When the separator becomes thicker, the battery block in which the battery cells are stacked becomes longer and larger, and the separator that cannot uniformly pressurize and support the pressing surface of the battery cell adversely affects the electrode of the battery cell. Furthermore, since the separator including the composite layer of the fiber sheet and the silica aerogel cannot absorb the expansion of the battery cell, when the battery cell expands, the pressure of the battery cell rapidly increases, and an extremely strong force acts on the end plate and the binding bar. For this reason, the end plate and the binding bar are required to have extremely strong materials and structures, the power supply device is heavy, large, and the material cost increases.

The present invention has been developed for the purpose of solving the above-mentioned disadvantages, and an object of the present invention is to provide a technology that can suppress deterioration of heat insulating properties of a separator due to expansion of a battery cell by absorbing expansion of the battery cell by the separator, equalizing pressure on a pressing surface of the battery cell, and further reduce application of an excessive force to an end plate or a binding bar due to expansion of the battery cell.

A power supply device according to an aspect of the present invention includes battery block 10 formed by laminating a plurality of battery cells 1 in a thickness with separator 2 interposed therebetween, a pair of end plates 3 disposed on both end surfaces of battery block 10, and bind bar 4 connected to the pair of end plates 3 and fixing battery block 10 in a pressurized state via end plates 3. Separator 2 includes heat insulating sheet 5 made of a fiber sheet and silica aerogel, and rubbery elastic sheets 6 stacked on the surface of heat insulating sheet 5.

An electric vehicle according to an aspect of the present invention includes the power supply device 100, a motor 93 for traveling to which electric power is supplied from the power supply device 100, a vehicle body 91 on which the power supply device 100 and the motor 93 are mounted, and wheels 97 driven by the motor 93 to cause the vehicle body 91 to travel.

The power supply device described above absorbs expansion of the battery cell by the separator to suppress deterioration of heat insulating properties of the separator due to expansion of the battery cell, and can equalize the pressure on the pressing surface of the battery cell, and furthermore can suppress the influence of excessive stress applied to the end plate and the binding bar due to expansion of the battery cell.

DESCRIPTION OF EMBODIMENTS

Figure 1:
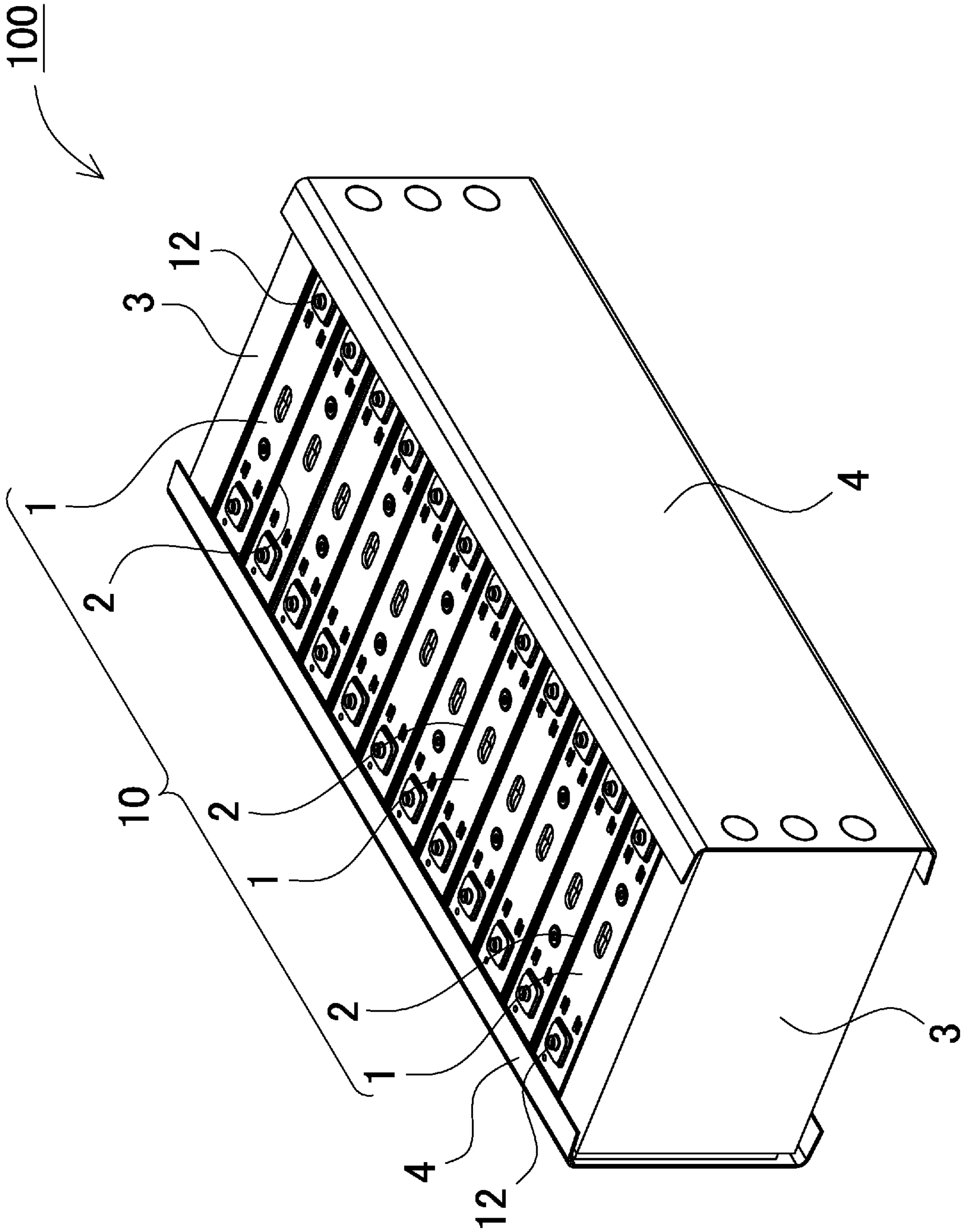
FIG. 1 is a perspective view of a power supply device according to an embodiment of the present invention.

The present invention will be described in detail below with reference to the drawings. In the following description, terms (e.g., “upper”, “lower”, and other terms including those terms) indicating specific directions and positions are used where necessary. However, use of these terms is for facilitation of understanding of the invention with reference to the drawings, and does not limit the technical scope of the present invention by the meanings of these terms. Parts denoted by the same reference numerals in a plurality of drawings indicate the same or equivalent parts or members.

Furthermore, the following exemplary embodiments illustrate specific examples of the technical idea of the present invention, and do not limit the present invention to the following. In addition, unless otherwise specified, dimensions, materials, shapes, relative arrangements, and the like of the components described below are not intended to limit the scope of the present invention thereto, but are intended to be illustrative. The contents described in one embodiment and example are applicable also to other embodiments and examples. In addition, sizes, positional relationships, and the like of members illustrated in the drawings may be exaggerated for clarity of description.

A power supply device according to a first exemplary embodiment of the present invention includes: a battery block in which a plurality of battery cells are stacked in a thickness with a separator interposed therebetween; a pair of end plates disposed on both end surfaces of the battery block; and a binding bar coupled to the pair of end plates and fixing the battery block in a pressurized state via the end plates. In the separator, rubbery elastic sheets are stacked on the surface of a heat insulating sheet including a fiber sheet and silica aerogel.

In the power supply device described above, since the separator between the battery cells is provided with the rubbery elastic sheet that deforms by expansion of the battery cells, the rubbery elastic sheets are pressurized and thinned when the battery cells expand. Therefore, it is possible to suppress an increase in surface pressure between the battery cells and the separator due to expansion of the battery cells. The heat insulating sheet including a fiber sheet and silica aerogel exhibits extremely excellent heat insulating properties, but when the silica aerogel is broken by strong compressive stress, the heat insulating properties are deteriorated. The structure in which the rubbery elastic sheet is thinned by the surface pressure and the rise in surface pressure of the separator can be suppressed prevents the breakage of the silica aerogel due to expansion of the battery cell and maintains the excellent heat insulating properties of the separator. The separator that maintains excellent heat insulating properties prevents thermal runaway of the battery cells from being induced next to each other for a long period of time, and ensures the safety of the power supply device for a long period of time.

Furthermore, in the power supply device described above, the rubbery elastic sheet that is thinly elastically deformed when pressurized is stacked on the surface of the heat insulating sheet to suppress an increase in surface pressure. This eliminates the need for the heat insulating sheet to have a complicated structure and a special structure for suppressing an increase in surface pressure, and moreover, when the pressure becomes strong, the rubbery elastic sheet thinly deforms to eliminate a local imbalance in surface pressure, thereby suppressing the surface pressure between the battery cell and the separator from becoming locally imbalanced. The fact that the imbalance in surface pressure can be reduced has an effect of being able to prevent the internal short circuit of the battery in which the positive electrode, the negative electrode, and the insulating layer are stacked in multiple layers and to improve the safety.

Furthermore, in the power supply device described above, since the increase in surface pressure due to expansion of the battery cell is suppressed by the rubbery elastic sheet of the separator, it is possible to prevent the battery cell from expanding and an excessive stress from acting on the end plate and the binding bar. The end plate and the binding bar that can reduce the maximum stress can be made thin and lightweight. Furthermore, in the power supply device in which the separator between the battery cells absorbs expansion of the battery cells, it is also possible to suppress the relative position from being displaced due to expansion of the battery cells. This can also prevent an adverse effect of the electric connection portion of the battery cell. This is because, while the stacked battery cells are electrically connected by fixing the bus bars of metal plates to the electrode terminals, if the battery cells are relatively displaced, an excessive stress acts on the bus bars and the electrode terminals, which causes a failure.

In the power supply device according to a second exemplary embodiment of the present invention, the separator has a structure in which rubbery elastic sheets are stacked on both surfaces of the heat insulating sheet. This power supply device can absorb expansion of the battery cell on both surfaces of the separator, and thus can uniformly absorb the expansion of both surfaces of the battery cell while stacking the thin rubbery elastic sheet on the surface of the heat insulating sheet.

In the power supply device according to a third exemplary embodiment of the present invention, the separator has a structure in which the rubbery elastic sheet is stacked only on one surface of the heat insulating sheet. In this power supply device, expansion of battery cells stacked on both surfaces of the separator can be absorbed by the rubbery elastic sheet stacked on one surface of the heat insulating sheet while reducing manufacturing cost by thinning the separator.

In the power supply device according to a fourth exemplary embodiment of the present invention, the rubbery elastic sheet is a synthetic rubber sheet. Furthermore, in the power supply device according to the fifth exemplary embodiment of the present invention, the synthetic rubber of the rubbery elastic sheet is any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, and polyether rubber.

The ethylene vinyl acetate copolymer rubber of the rubbery elastic sheet can have a high heat resistance temperature of 200° C., the acrylic rubber can have a high heat resistance temperature of 180° C., the fluororubber can have a high heat resistance temperature of 300° C., and the silicone rubber can have a high heat resistance temperature of 280° C.

In the power supply device according to a sixth exemplary embodiment of the present invention, the thickness of the rubbery elastic sheet is from 0.2 mm to 2 mm inclusive.

In the power supply device according to a seventh exemplary embodiment of the present invention, the heat insulating sheet is made thicker than the rubbery elastic sheet to improve the heat insulating properties of the separator and effectively suppress the induction of thermal runaway of the battery cells.

In the power supply device according to an eighth exemplary embodiment of the present invention, the heat insulating sheet is from 0.5 mm to 2 mm inclusive.

The power supply device according to a ninth exemplary embodiment of the present invention has a structure in which each of all separators stacked between battery cells has rubbery elastic sheets stacked on the surface of the heat insulating sheet. In this power supply device, since each of all the separators has the rubbery elastic sheets stacked on the surface of the heat insulating sheet, expansion of all the battery cells can be uniformly absorbed by the rubbery elastic sheets, and a rise in surface pressure of the battery cell and the separator can be effectively suppressed.

First Exemplary Embodiment

Figure 2:
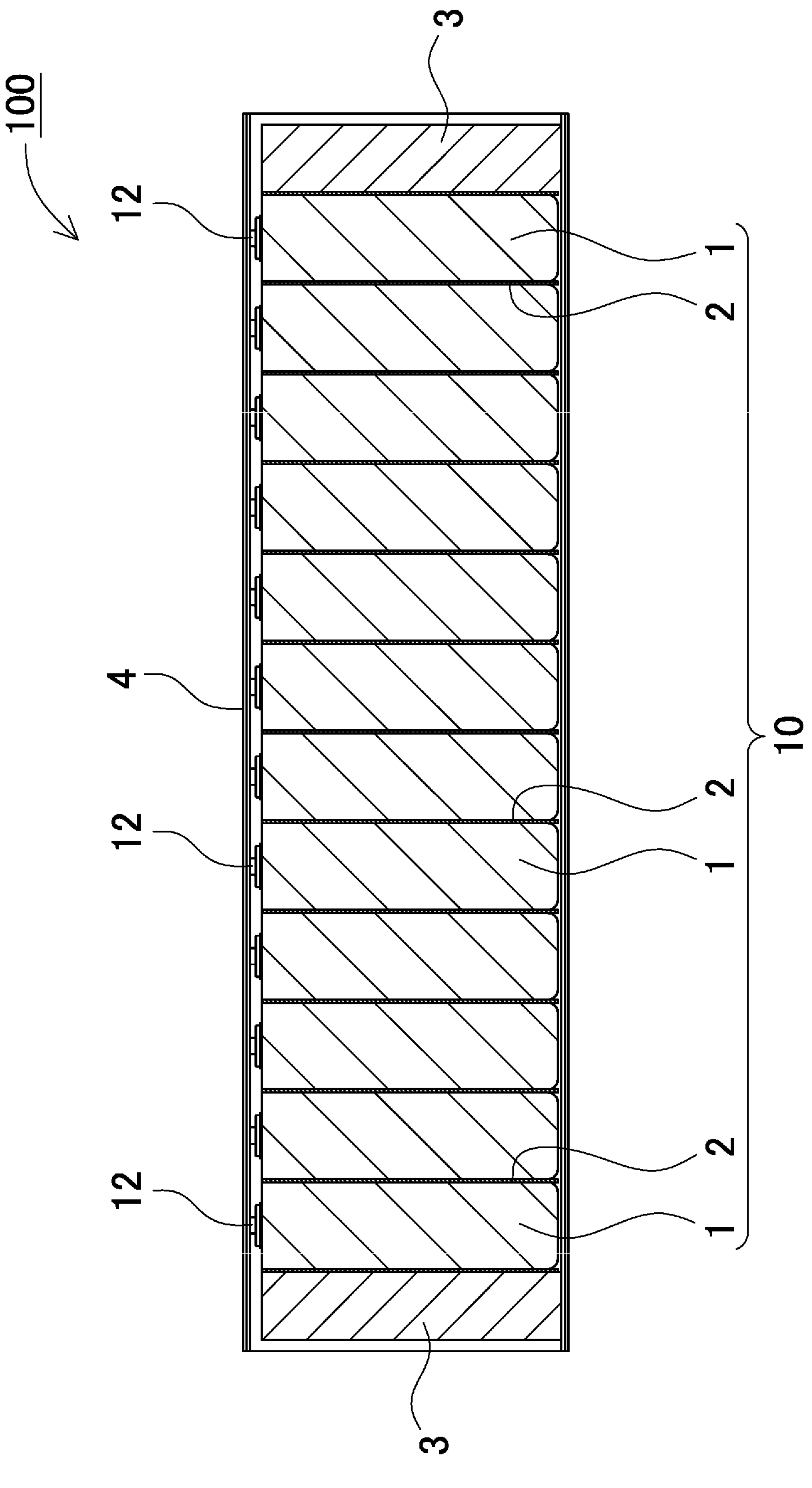
FIG. 2 is a vertical cross-sectional view of the power supply device illustrated in FIG. 1.
Figure 3:
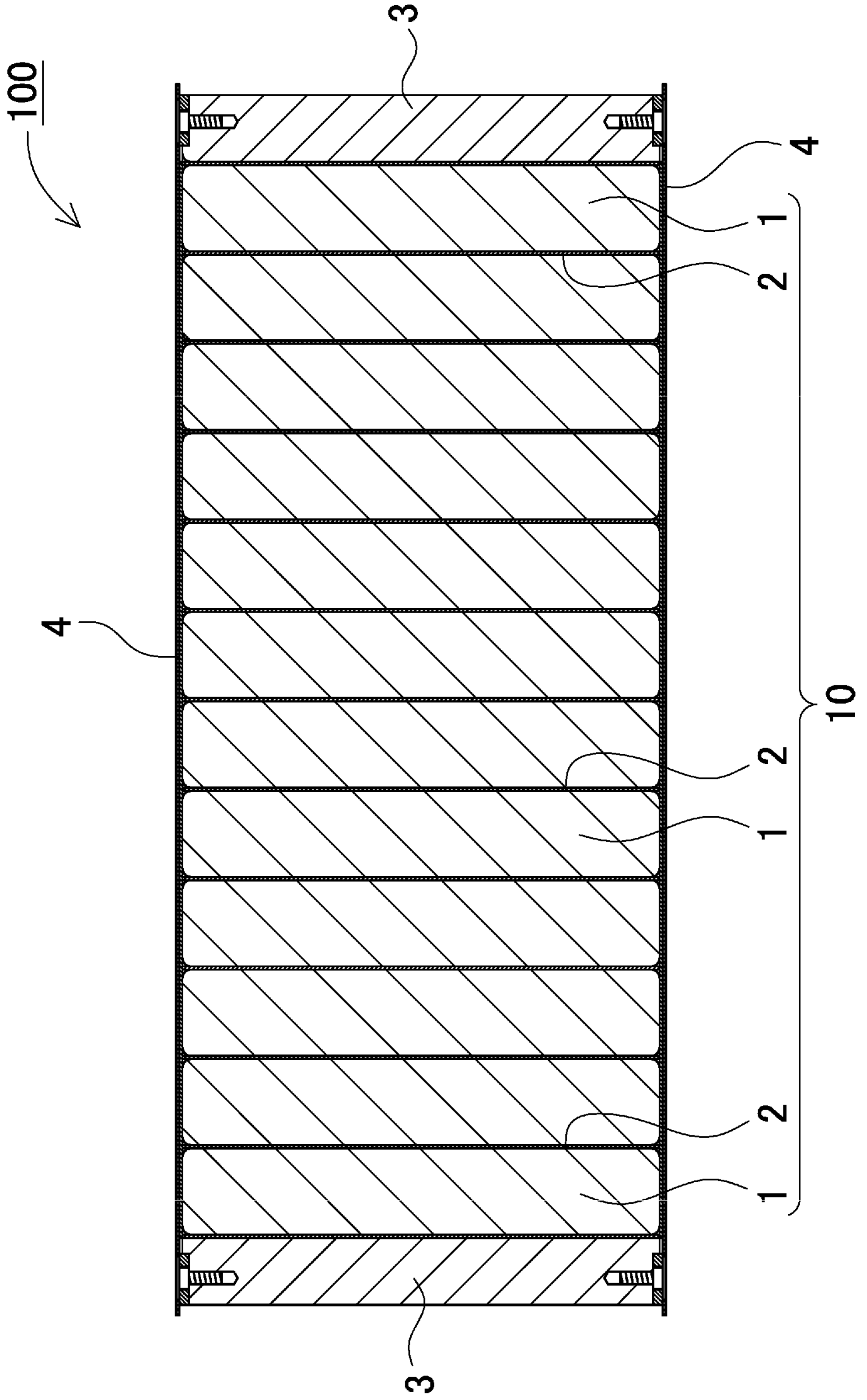
FIG. 3 is a horizontal cross-sectional view of the power supply device shown in FIG. 1.

Power supply device 100 illustrated in the perspective view of FIG. 1, the vertical cross-sectional view of FIG. 2, and the horizontal cross-sectional view of FIG. 3 includes battery block 10 in which a plurality of battery cells 1 are stacked in a thickness with separator 2 interposed therebetween, a pair of end plates 3 disposed on both end surfaces of battery block 10, and binding bar 4 that couples the pair of end plates 3 and fixes battery block 10 in a pressurized state via end plates 3.

Battery Block 10

Battery cell 1 of battery block 10 is a prismatic battery cell having a quadrangular outer shape, and a pair of positive and negative electrode terminals 12 that protrude upward are provided at both ends of the upper surface. A safety valve (not illustrated) is provided between electrode terminals 12. The safety valve opens to release internal gas when the internal pressure of battery cell 1 rises to a predetermined value or more. The safety valve prevents an increase in internal pressure of battery cell 1.

Battery Cell 1

The battery cell 1 is a lithium ion secondary battery. Power supply device 100 in which battery cell 1 is a lithium ion secondary battery has an advantage of an increased charge capacity with respect to the capacity and weight. However, battery cell 1 may be any other chargeable battery such as a non-aqueous electrolyte secondary battery other than the lithium ion secondary battery.

End Plate 3, Binding Bar 4

End plate 3 is a metal plate having an outer shape substantially equal to the outer shape of battery cell 1, which is not deformed by being pressed by battery block 10, and binding bar 4 is coupled to both side edges of end plate 3. Binding bar 4 couples, in a pressurized state, battery cells 1 on which end plates 3 are stacked, and fixes battery block 10 in the pressurized state at a predetermined pressure.

Separator 2

Separator 2 is sandwiched between stacked battery cells 1 to insulate adjacent battery cells 1, further interrupts heat conduction between the batteries, and further absorbs expansion of battery cells 1. Battery block 10 has a bus bar (not illustrated) fixed to electrode terminals 12 of adjacent battery cells 1 to connect battery cells 1 in series or in parallel. Battery cells 1 connected in series are insulated and stacked by separator 2 because a potential difference is generated between the battery cases. Battery cells 1 connected in parallel are insulated and stacked by separator 2 in order to prevent induction of thermal runaway although no potential difference is generated between the battery cases.

Figure 4:
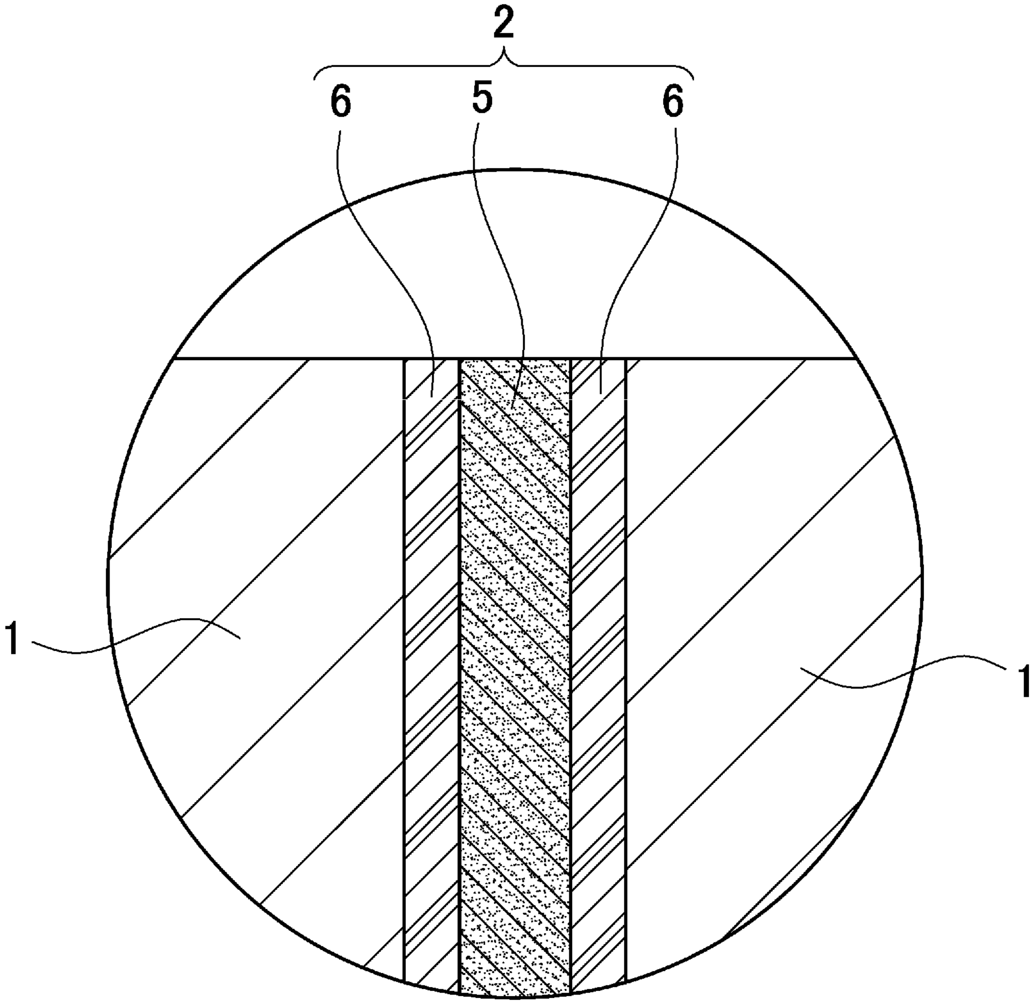
FIG. 4 is an enlarged cross-sectional view of a main part of a separator.

As shown in the enlarged cross-sectional view of FIG. 4, separator 2 has rubbery elastic sheets 6 stacked on the surfaces of heat insulating sheet 5. Heat insulating sheet 5 includes a fiber sheet and extremely small silica aerogel. Rubbery elastic sheet 6 is a sheet that is pressed to be thinly elastically deformed. The thickness of rubbery elastic sheet 6 is elastically changed by the pressure to absorb expansion and contraction of battery cell 1, thereby preventing deterioration of heat insulating sheet 5. Heat insulating sheet 5 made of silica aerogel is deteriorated in thermal insulating properties when the fragile silica aerogel is compressed and destroyed. Rubbery elastic sheet 6 reduces the compressive stress of the silica aerogel at the time of expansion of battery cells 1 to prevent destruction, maintains the excellent heat insulating properties of heat insulating sheet 5 for a long period of time, and prevents induction of thermal runaway between battery cells 1.

Heat Insulating Sheet

Heat insulating sheet 5 includes a fiber sheet and silica aerogel. In heat insulating sheet 5, the fiber gaps of the fiber sheet are filled with silica aerogel having a nanosize porous structure. Heat insulating sheet 5 is manufactured by impregnating fibers with a gel raw material of silica aerogel. A fiber sheet is impregnated with silica aerogel, then fibers are stacked, a gel raw material is reacted to form a wet gel, and the wet gel surface is hydrophobized and dried with hot air. The fiber of the fibrous sheet is polyethylene terephthalate (PET). However, as the fiber of the fiber sheet, inorganic fibers such as flame-retardant oxidized acrylic fibers and glass wool can also be used.

The fiber sheet of heat insulating sheet 5 preferably has a fiber diameter of 0.1 to 30 μm. The fiber diameter of the fiber sheet is made smaller than 30 μm to reduce heat conduction by the fibers, so that heat insulating properties of heat insulating sheet 5 can be improved. Silica aerogel is fine particles composed of a skeleton of silicon dioxide ($SiO_2$) and 90% to 98% of air. Silica aerogel has a cluster structure in which spherical bodies of 2 nm to 20 nm are bonded, has fine pores of equal to or less than 100 nm between the skeletons formed by the cluster, and has a three-dimensional fine porous structure.

Heat insulating sheet 5 composed of a fiber sheet and silica aerogel is thin and exhibits excellent heat insulating properties. Heat insulating sheet 5 is set to have a thickness that is enough to be able to prevent induction of thermal runaway of battery cells 1 in consideration of energy of heat generated by thermal runaway of battery cells 1. The energy generated by the thermal runaway of battery cells 1 increases when the charge capacity of battery cells 1 increases. Accordingly, the thickness of heat insulating sheet 5 is set to an optimum value in consideration of the charge capacity of battery cells 1. For example, for a power supply device in which a lithium ion secondary battery having a charge capacity of 5 Ah to 20 Ah is used as battery cell 1, the thickness of heat insulating sheet 5 is set to 0.5 mm to 2 mm, optimally about 1 mm to 1.5 mm. However, in the power supply device of the present exemplary embodiment, the thickness of heat insulating sheet 5 is not specified within the above range, and the thickness of heat insulating sheet 5 is set to an optimum value in consideration of the heat insulating property of thermal runaway including the fiber sheet and the silica aerogel and the heat insulating property required for preventing induction of thermal runaway of battery cells 1.

Rubbery Elastic Sheet 6

As shown in FIG. 4, separator 2 has rubbery elastic sheets 6 stacked on both surfaces of heat insulating sheet 5. In rubbery elastic sheet 6, the deformation amount due to pressurization of battery cell 1 can be set to an optimum value by adjusting hardness. The hardness of rubbery elastic sheet 6 is set to an optimum value in consideration of the pressure of battery cell 1, and is preferably from 10 degrees to 80 degrees inclusive, and more preferably 10 degrees to 70 degrees inclusive. When the hardness of rubbery elastic sheet 6 is too low, separator 2 is thinly crushed in battery cell 1. Therefore, the hardness of rubbery elastic sheet 6 is set to an optimum value in consideration of the pressure at which battery cell 1 pressurizes separator 2.

Rubbery elastic sheet 6 is a sheet having elasticity that is deformed by a pressure applied to rubbery elastic sheet 6. The thickness of rubbery elastic sheet 6 is elastically deformed to uniformly absorb expansion of battery cell 1. Rubbery elastic sheet 6 can be, for example, a synthetic rubber sheet such as silicone rubber or urethane rubber. Furthermore, the synthetic rubber of rubbery elastic sheet 6 can be any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, and polyether rubber. When rubbery elastic sheet 6 is made of urethane rubber, it is particularly preferable to use thermoplastic polyurethane rubber or foamed polyurethane rubber. When rubbery elastic sheet 6 is made of foamed urethane rubber, the physical properties of the foamed urethane rubber are preferably a density of 150 kg/m3 to 750 kg/m3, a thickness of 0.5 mm to 6.0 mm, and a compression set of 20% or less. The compression set mentioned here can be obtained by the following method. The foamed urethane rubber to be measured is compressed by 50% at an environmental temperature of 100° C. The compressed state is maintained for 22 hours. Thereafter, the compressed state is released, and the thickness of the foamed urethane rubber is measured. The compression set is obtained by comparing the thicknesses before and after the test.

Since separator 2 is stacked between battery cells 1, thick separator 2 enlarges battery block 10. In order to downsize battery block 10, separator 2 is required to be as thin as possible. In the power supply device, the charge capacity with respect to the volume is an extremely important characteristic. In power supply device 100, in order to downsize battery block 10 and increase the charge capacity, separator 2 is required to have a characteristic of preventing induction of thermal runaway of battery cell 1 by thinning rubbery elastic sheet 6 and heat insulating sheet 5. Rubbery elastic sheet 6 is, for example, from 0.2 mm to 2 mm inclusive, more preferably from 0.3 mm to 1 mm inclusive to suppress an increase in compressive stress due to expansion of battery cells 1. Furthermore, rubbery elastic sheet 6 is preferably made thinner than heat insulating sheet 5 to reduce the compressive stress of the silica aerogel at the time of expansion of battery cells 1.

Figure 5:
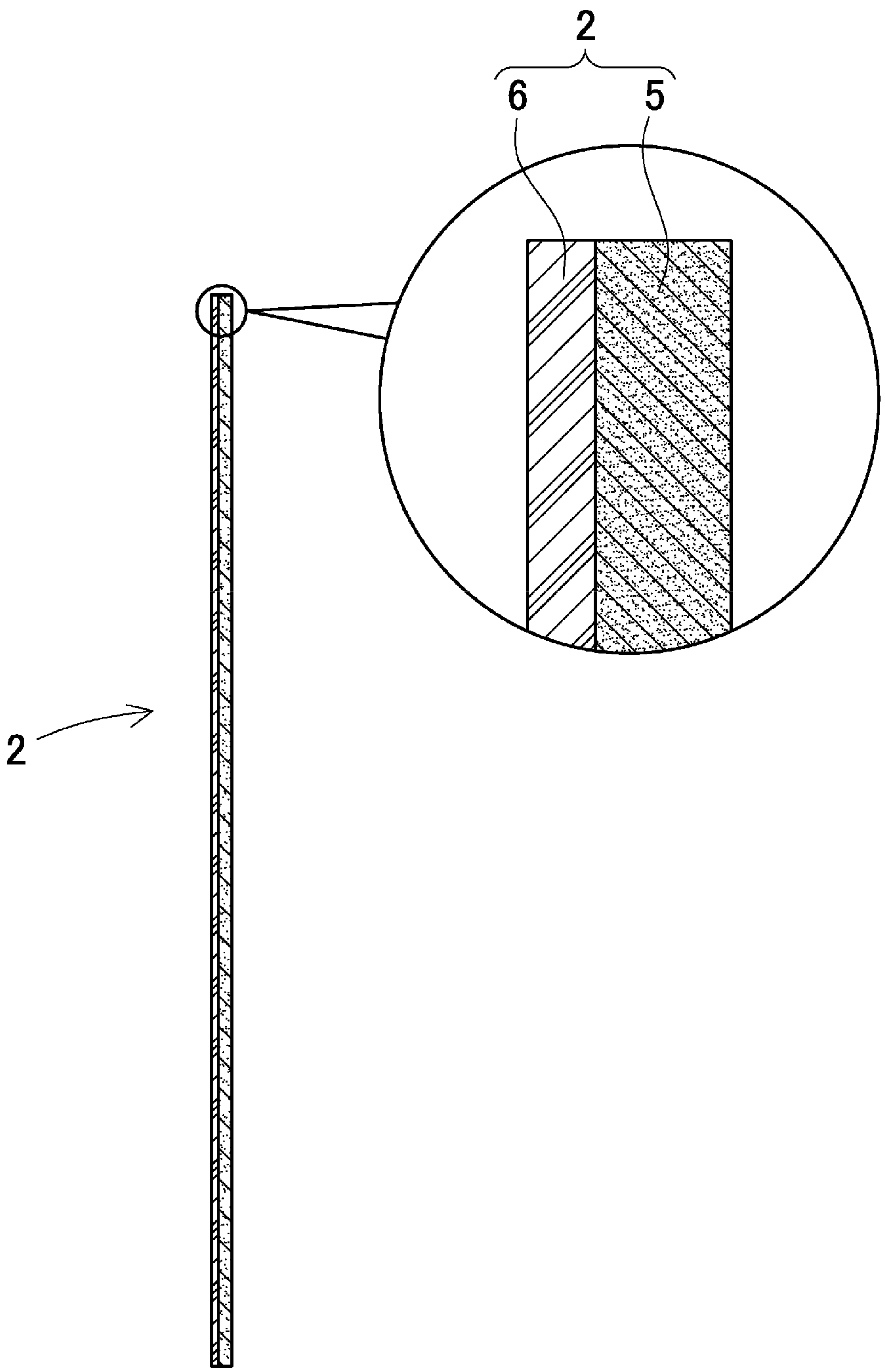
FIG. 5 is a partially enlarged cross-sectional view showing another example of the separator.

Power supply device 100 described above preferably has a structure in which each of all separators 2 have rubbery elastic sheets 6 stacked on both surfaces of heat insulating sheet 5, but does not necessarily have a structure in which each of all separators 2 have rubbery elastic sheets 6 stacked on both surfaces of heat insulating sheet 5. As shown in FIG. 5, in separator 2, it is possible to stack rubbery elastic sheet 6 on one surface of heat insulating sheet 5. Furthermore, in the power supply device, all the separators do not need to have a stack structure of the heat insulating sheets and the rubbery elastic sheets, and the separator having only the heat insulating sheet and the separator having a stack structure of the heat insulating sheets and the rubbery elastic sheets can be provided in a mixed manner.

Rubbery elastic sheet 6 and heat insulating sheet 5 are bonded to each other with an adhesive layer or a sticky layer interposed therebetween and stacked at a fixed position. Note that rubbery elastic sheet 6 and heat insulating sheet 5 may be integrally molded by a method such as two-color molding, and are not necessarily bonded via an adhesive layer or a sticky layer. Separator 2 and battery cell 1 are also bonded to each other with an adhesive or a sticky layer interposed therebetween and disposed at a fixed position. Separator 2 can also be disposed at a fixed position of a battery holder (not illustrated) in which battery cells 1 are disposed at fixed positions in a fitting structure.

In power supply device 100 described above, battery cell 1 is a prismatic battery cell having a charge capacity of 6 Ah to 10 Ah, heat insulating sheet 5 of separator 2 is "NASBIS (registered trademark) manufactured by Panasonic Corporation" of 1 mm thick including a fiber sheet and silica aerogel, and rubbery elastic sheets 6 stacked on both surfaces of heat insulating sheet 5 is urethane rubber sheets having a thickness of 0.5 mm, so that specific battery cell 1 can be forcibly thermally runaway to prevent induction of thermal runaway to adjacent battery cells 1.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the vehicle, an example will be described in which a large number of the above-described power supply devices are connected in series or in parallel, and large-capacity, high-output power supply device 100 to which a necessary control circuit is further added is constructed.

Power Supply Device for Hybrid Vehicle

Figure 6:
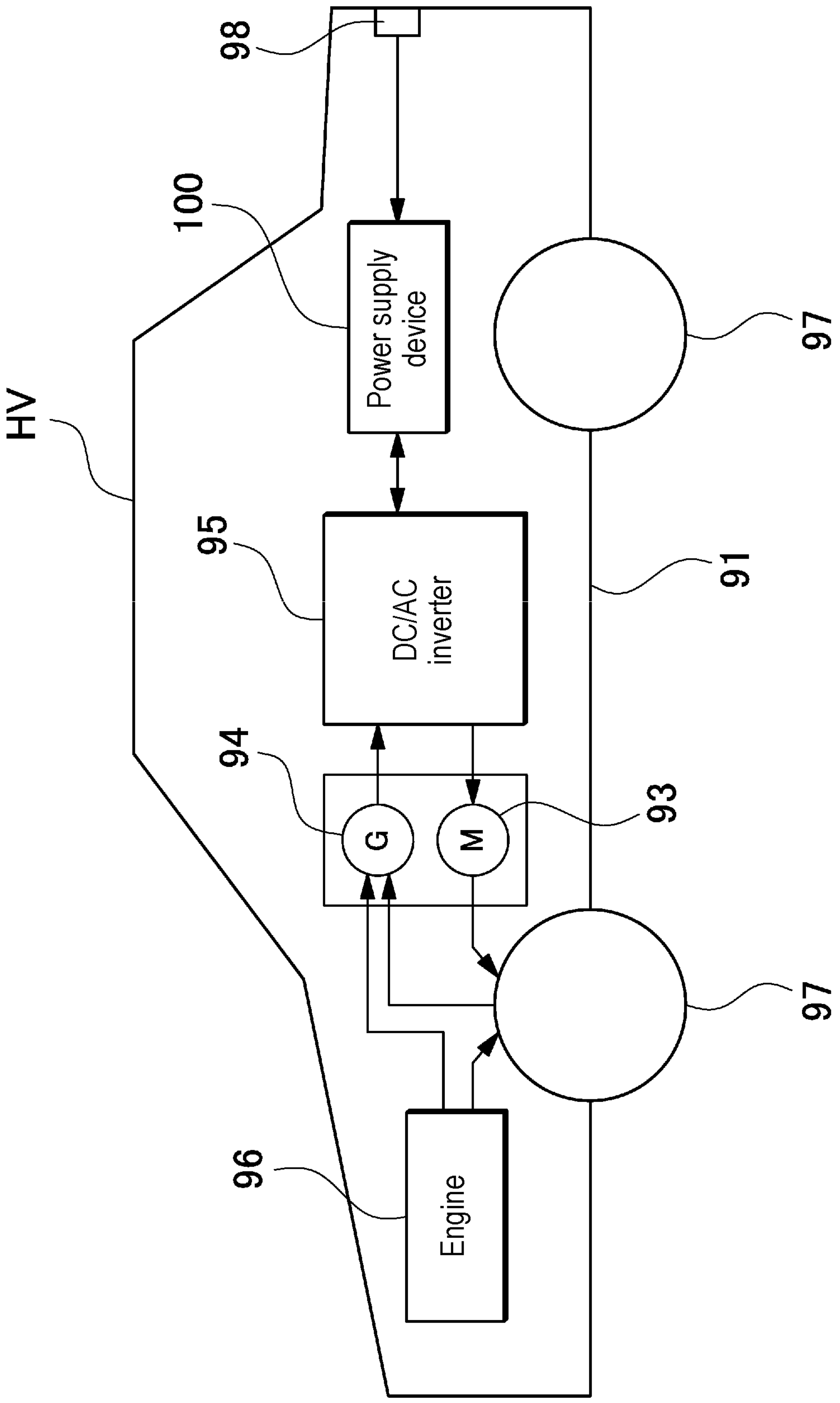
FIG. 6 is a block diagram showing an example in which the power supply device is mounted on a hybrid vehicle traveling by an engine and a motor.

FIG. 6 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by power supplied from power supply device 100. Generator 94 is driven by engine 96 or by regenerative braking when braking the vehicle to charge the battery of power supply device 100. As shown in FIG. 6, vehicle HV may include charging plug 98 for charging power supply device 100. Power supply device 100 can be charged by connecting charging plug 98 to an external power supply.

Power Supply Device for Electric Vehicle

Figure 7:
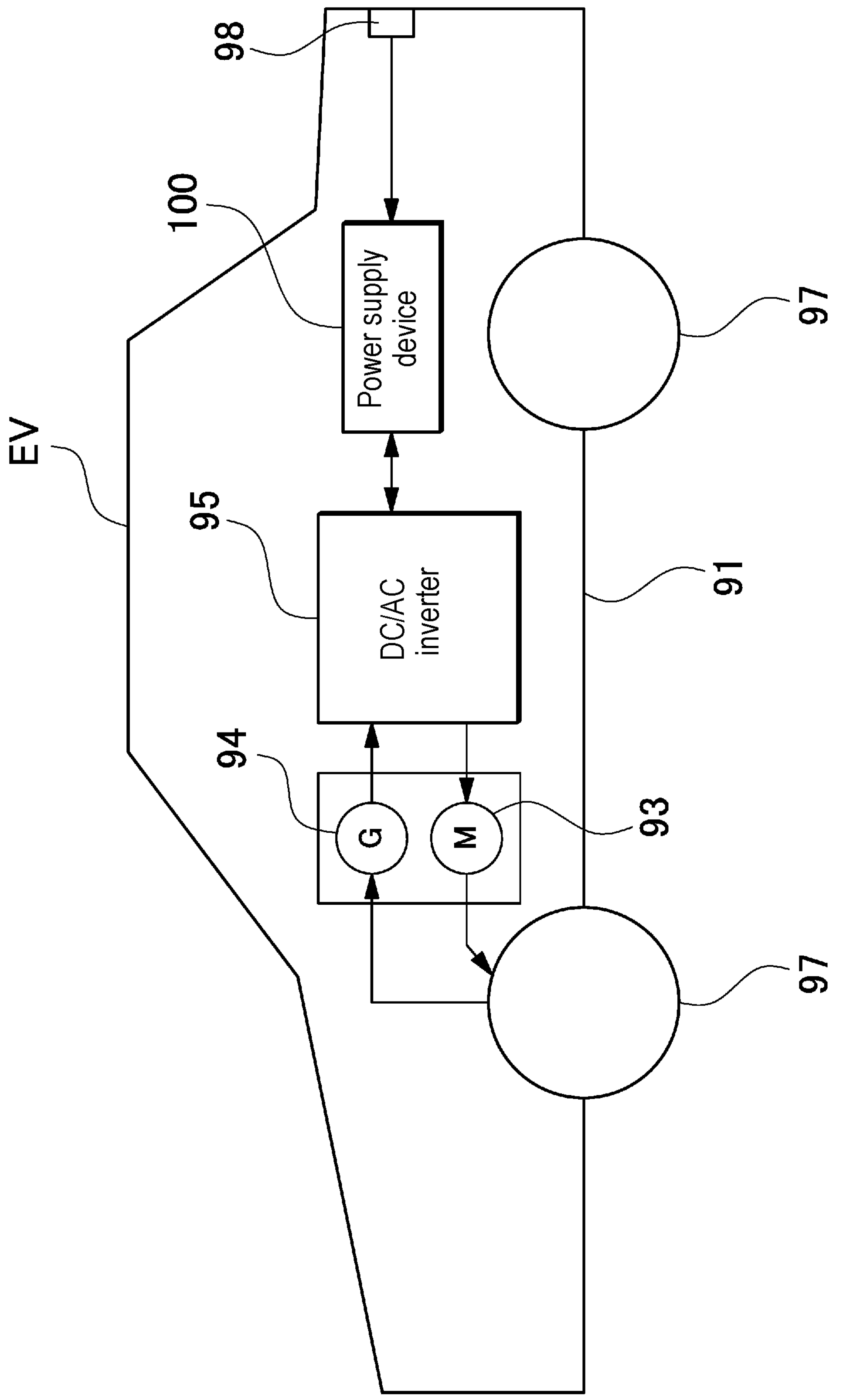
FIG. 7 is a block diagram showing an example in which the power supply device is mounted on an electric vehicle traveling only by a motor.

FIG. 7 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. Power supply device 100 is connected to motor 93 and generator 94 via DC/AC inverter 95. Motor 93 is driven by power supplied from power supply device 100. Generator 94 is driven by the energy at the time of regenerative braking of vehicle EV to charge the battery of power supply device 100. In addition, vehicle EV includes charging plug 98, and power supply device 100 can be charged by connecting charging plug 98 to an external power supply.

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like.

Furthermore, the power supply device can also be used as a power supply for a power storage device that stores electricity by charging a battery using midnight electric power at night. The power supply device charged with the midnight power can be charged with the midnight electric power, which is surplus power of the power plant, outputs power in the daytime when the power load becomes large, and limit the peak power in the daytime to be small. Furthermore, the power supply device can also be used as a power supply that charges with both the output of a solar cell and the midnight electric power. This power supply device can efficiently store electricity in consideration of weather and power consumption by effectively using both power generated by the solar cell and midnight electric power.

The power storage device as described above can be suitably used for applications such as a backup power supply device that can be mounted on a rack of a computer server, a backup power supply device for a wireless base station such as a mobile phone, a power supply for household or factory power storage, a power supply device combined with a solar cell such as a power supply for street lamps, and a backup power supply for traffic lights and traffic indicators for roads.

INDUSTRIAL APPLICABILITY

The power supply device according to the present invention can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. The present invention can be appropriately used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and the like.

REFERENCE MARKS IN THE DRAWINGS

100: power supply device
1: battery cell
2: separator
3: end plate
4: binding bar
5: heat insulating sheet
6: rubbery elastic sheet
10: battery block
12: electrode terminal
91: vehicle body
93: motor
94: generator
95: DC/AC inverter
96: engine
97: wheel
98: charging plug
HV, EV: vehicle

The invention claimed is:

1. A power supply device comprising:

a battery block including a plurality of battery cells stacked along a thickness of each of the plurality of battery cells with a separator interposed between the plurality of battery cells;

a pair of end plates disposed on both end surfaces of the battery block; and a binding bar coupled to the pair of end plates and fixing the battery block in a pressurized state via the end plates, wherein the separator includes a heat insulating sheet including a fiber sheet and silica aerogel, and an elastic sheet stacked on an entirety of a surface of the heat insulating sheet that faces an adjacent battery cell of the plurality of battery cells, wherein the elastic sheet comprises a synthetic rubber whose hardness is from 10 degrees to 80 degrees inclusive and whose compression set is 20% or less.

2. The power supply device according to claim 1, wherein the elastic sheet is stacked on each of both surfaces of the heat insulating sheet.

3. The power supply device according to claim 1, wherein the elastic sheet is stacked only on one surface of the heat insulating sheet.

4. The power supply device according to claim 1, wherein the elastic sheet is made of a synthetic rubber sheet.

5. The power supply device according to claim 1, wherein the synthetic rubber comprises any of isoprene rubber, styrene butadiene rubber, butadiene rubber, chloroprene rubber, nitrile rubber, polyisobutylene rubber, ethylene propylene rubber, ethylene vinyl acetate copolymer rubber, chlorosulfonated polyethylene rubber, acrylic rubber, fluororubber, epichlorohydrin rubber, urethane rubber, silicone rubber, thermoplastic olefin rubber, ethylene propylene diene rubber, butyl rubber, polyether rubber, or a combination thereof.

6. The power supply device according to claim 1, wherein a thickness of the elastic sheet is from 0.2 mm to 2 mm inclusive.

7. The power supply device according to claim 6, wherein the heat insulating sheet is thicker than the elastic sheet.

8. The power supply device according to claim 1, wherein a thickness of the heat insulating sheet is from 0.5 mm to 2 mm inclusive.

9. The power supply device according to claim 1, wherein the separator is stacked between each pair of adjacent battery cells among the plurality of battery cells.

10. An electric vehicle comprising:

the power supply device according to claim 1;

a motor for traveling supplied with electric power from the power source device;

a vehicle body mounted with the power supply device and the motor; and a wheel driven by the motor to cause the vehicle body to travel.

11. A power supply device comprising:

a battery block including a plurality of battery cells stacked along a thickness of each of the plurality of battery cells with a separator interposed between the plurality of battery cells;

a pair of end plates disposed on both end surfaces of the battery block; and a binding bar coupled to the pair of end plates and fixing the battery block in a pressurized state via the end plates, wherein the separator includes a heat insulating sheet including a fiber sheet and silica aerogel, and an elastic sheet stacked on a surface of the heat insulating sheet, wherein the elastic sheet is made of a synthetic rubber sheet that has a compression set of 20% or less and that has a hardness from 10 degrees to 80 degrees inclusive.

12. The power supply device according to claim 1, wherein the synthetic rubber comprises a foamed urethane rubber.

13. The power supply device according to claim 12, wherein the foamed urethane rubber has a density of 150 $kg/m^3$ to 750 $kg/m^3$.

* * * * *